United States Patent [19]

Andres et al.

[11] Patent Number: 4,608,501
[45] Date of Patent: Aug. 26, 1986

[54] TRIPPING APPARATUS FOR AN OCCUPANT PROTECTION APPARATUS IN VEHICLES

[75] Inventors: Rudolf Andres, Sindelfingen; Hansjürgen Scholz, Waldenbuch; Heinz W. Knoll, Stuttgart; Luigi Brambilla, Boeblingen; Volker Petri, Aidlingen; Alban Bossenmaier, Stuttgart, all of Fed. Rep. of Germany

[73] Assignee: Daimler-Benz Aktiengesellschaft, Fed. Rep. of Germany

[21] Appl. No.: 689,850

[22] Filed: Jan. 9, 1985

[30] Foreign Application Priority Data

Jan. 10, 1984 [DE] Fed. Rep. of Germany ....... 3400533

[51] Int. Cl.$^4$ ............... B62D 45/00; B60R 21/02
[52] U.S. Cl. ............... 307/105 B; 307/10 R; 307/9; 340/52 H; 180/271; 180/274; 280/802
[58] Field of Search ............... 307/10 R, 9, 105 B; 280/728, 734, 735, 753, 752, 802, 807; 180/116, 268, 271, 274, 282; 340/52 R, 52 H, 52 E, 52 F, 53, 61

[56] References Cited

U.S. PATENT DOCUMENTS

| | | | |
|---|---|---|---|
| 3,601,655 | 8/1971 | Anderson | 340/52 H |
| 3,622,974 | 11/1971 | Best | 340/52 R |
| 3,629,816 | 12/1971 | Gillund | 280/735 X |
| 3,633,159 | 1/1972 | Dillman | 340/52 H |
| 3,745,523 | 7/1973 | Lewis et al. | 340/52 R |
| 3,863,208 | 1/1975 | Balban | 340/52 H |
| 4,158,191 | 6/1979 | Rogers et al. | 280/735 X |
| 4,359,715 | 11/1982 | Langer et al. | 340/52 R |
| 4,366,465 | 12/1982 | Veneziano | 340/52 R |
| 4,381,829 | 5/1983 | Montaron | 280/735 X |
| 4,410,875 | 10/1983 | Spies et al. | 280/735 X |

*Primary Examiner*—William M. Shoop, Jr.
*Assistant Examiner*—Shik Luen Paul Ip
*Attorney, Agent, or Firm*—Craig and Burns

[57] ABSTRACT

Tripping apparatus in vehicles for an occupant protection apparatus in impact restraining systems is provided with a test circuit which permits a testing of the evaluation circuit and of the switching stage of the tripping apparatus by means of an alternating voltage signal without interrupting the functional readiness of the apparatus. The test circuit consists of a series arrangement of a filter, a maximum value rectifier and an integrator and is inserted between the output of the switching stage and the input of the evaluation circuit.

3 Claims, 2 Drawing Figures

TRIPPING APPARATUS FOR AN OCCUPANT PROTECTION APPARATUS IN VEHICLES

The invention relates to a tripping apparatus in vehicles, particularly for an occupant protection apparatus in impact restraining systems having an acceleration sensor, an evaluation circuit and a switching stage which switches a striking circuit, wherein a tripping element and an acceleration element are connected in series arrangement with the switch of the switching stage in the excitation circuit of tripping element. An apparatus of this type is described in German Offenlegungsschrift No. 3,207,216.

Such a protection apparatus requires to be checked for serviceability at certain intervals.

The testing of sensors by external excitation by means of physical quantities is known. Self-test systems which check the electronics internally are also known. Complicated control units generate transducer signals, feed these signals to block the final stages if necessary, and evaluate the transient signal. For such systems, it is a disadvantage that the appliance is not available for its actual function during the testing and checking procedure, and also that the volume of components is of an order of magnitude which is equal to or greater than that of the primary system. The costs are correspondingly high.

However, it is possible to feed direct transducer substitution signals externally in the motor vehicle only with a large delay (interference interval) for safety consideration. The place of installation of the protection apparatus is positively dictated by the mechanical design structure of each vehicle. A lead cable would therefore be indispensable in order to be able to perform the test from another accessible position, for example. Such a lead cable is provided for the testing of the tripping element (primer capsule) in certain constructions.

External electromagnetic influences (EMV) cause the induction of interference quantities and hence interference with the sensor. This may lead to faults or incorrect behavior, and cause extreme malfunction by erroneous tripping, in the case of crash sensors with associated units such as belt tensioners and airbag, for example.

It is an object of the invention to provide an occupant protection apparatus in impact restraining systems has an acceleration center, an evaluation circuit and a switching stage which activates a tripping element and an acceleration element are connected in series arrangement with the switch of the switching stage in the excitation circuit of the tripping element and by the provision of a test circuit which is simple, inexpensive to produce and is also available for actual function during the test procedure, without inducing additional external electromagnetic interference.

It is a further object of the invention to provide an apparatus for vehicle restraint systems wherein it is provided a test circuit comprising a series arrangement of a filter tuned to a given frequency, a maximum value rectifier and an integrator together with a switching stage and an acceleration switch, the output of the latter being connected to an evaluation circuit.

These and other objects, features, and advantages of the present invention will become more apparent from the following description when taken in connection with the accompanying drawings which show, for the purposes of illustration only, one embodiment in accordance with the present invention, and wherein.

Figure 1:
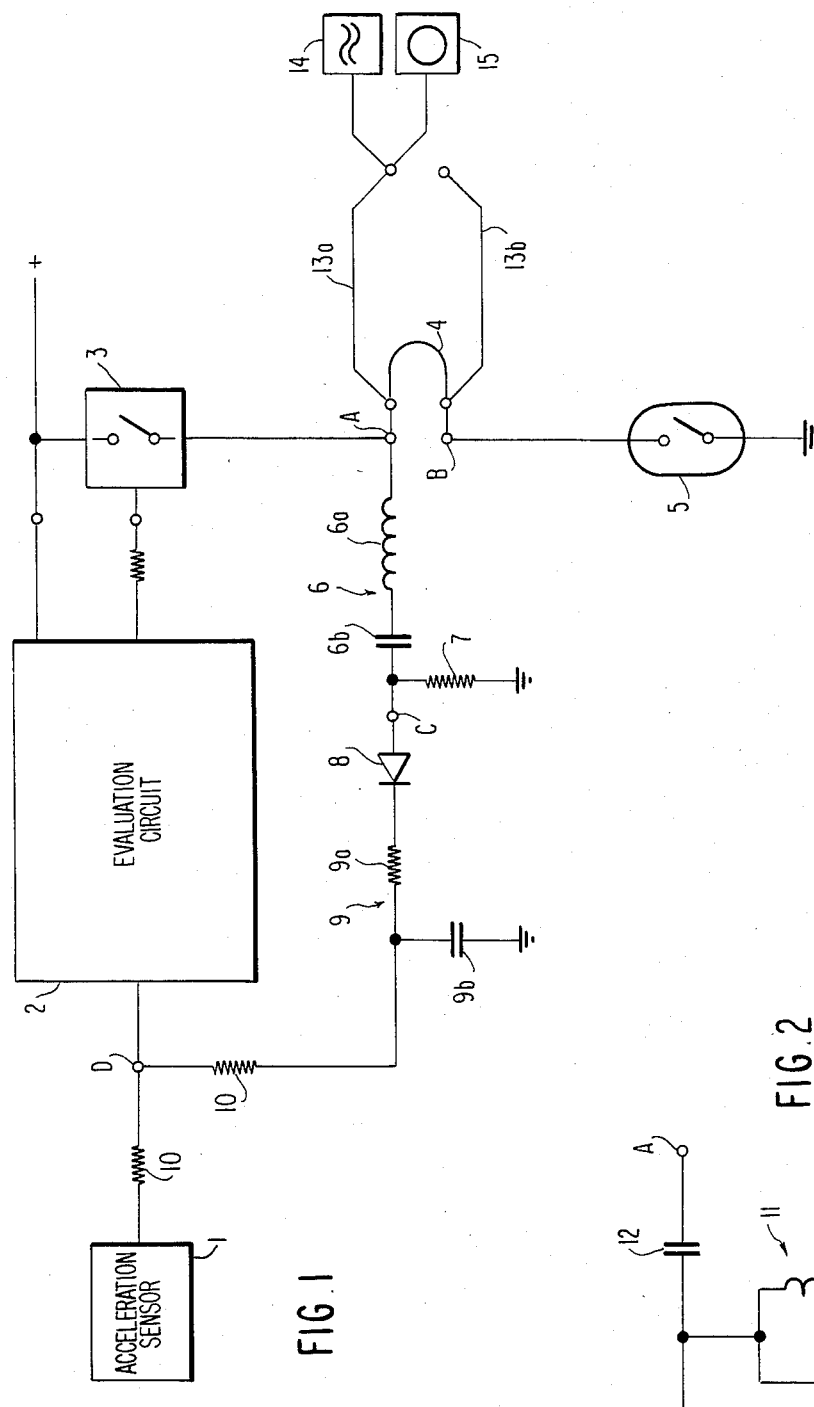
FIG. 1 shows a test circuit integrated into the tripping apparatus.

Turning to a consideration of the figures wherein like reference numerals represent like elements, FIG. 1 illustrates diagrammatically a tripping apparatus for an airbag, for example, with an integrated test circuit. An acceleration sensor 1 is followed by an evaluation circuit 2, which contains an integrating element and a threshold switch for example. This is followed by a switching stage 3, of which the switch, illustrated symbolically, is placed in the excitation circuit of the tripping element 4 in series arrangement with the latter and with an acceleration safety switch 5 between the poles of a voltage source. This circuit is known per se.

The function of the tripping apparatus is as follows: The acceleration sensor 1 is adjusted to a given threshold value. During deceleration the switch closes, the voltage applied is integrated until it attains the threshold of the following threshold value switch. The switching stage 3, which is activated by evaluation circuit 2, closes the excitation circuit and thus activates the tripping element 4, even if the acceleration safety switch 5, which is adjusted to a low threshold value, is closed.

The three elements placed in series arrangement in the excitation circuit—switching stage 3, tripping element 4 and acceleration safety switch 5—may be arranged in any desired manner, although the solution in which the tripping element 4 is placed between the two other elements 3 and 5 is preferred because in this case the tripping element 4 is at zero potential—that is to say, is isolated from the poles of the voltage source—in the inactive condition.

The input of the test circuit is connected to such a point, at zero potential in the rest condition, designated A and B in FIG. 1. This circuit comprises the series arrangement of a filter 6, which is formed in this case by a series oscillation circuit consisting of a coil 6a and of a capacitor 6b, and of a maximum value rectifier formed by a diode 8, and by an integrator 9 formed by a resistance 9a and a capacitor 9b. A resistance 7, which is connected between capacitor 6b and diode 8, leads to the negative pole of the voltage source. The output of the integrator 9 is connected to the point D between the acceleration sensor 1 and the evaluation circuit 2, with interposition of an adapting element if necessary, for example, a resistance 10.

Figure 2:
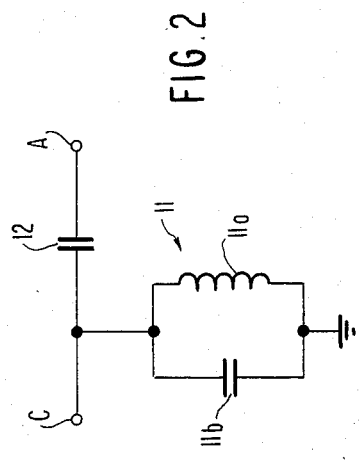
FIG. 2 shows an alternative feature of the test circuit.

According to FIG. 2 of the drawing, the filter 6 with the resistance 7 between the points A and C may be replaced by a parallel oscillation circuit 11 with coil 11a and capacitor 11b and with a further capacitor 12.

The function of the test circuit is explained below. A frequency generator 14, which is connected to earth at the point A (FIG. 1) or, if adaptor, cables 13a and 13b are present for testing the tripping element 4, to the end point of one of them (of the cable 13a in this case), can deliver an alternating voltage of definite impulse shape and with a given frequency which lies in a frequency range with the least possible interference by external electromagnetic influences (transmitting installations for example), approximately 100 kHz, for example. The filter 6 is tuned to this frequency and permits the transfer only of a signal of the given frequency. For higher and lower remote frequencies, the filter circuit constitutes a high resistance. The alternating voltage applied to the resistance 7 is consequently a function of the frequency. The voltage divider formed by filter circuit 6 and resistance 7 constitutes an EMV protection for the test circuit on its input side. Direct voltages are blocked by the capacitor 6b. Any erroneous tripping by a direct voltage is therefore reliably prevented. The alternating voltage signal which is allowed to pass is then rectified in the diode 8 and integrated in the integrator 9. The integrator 9 acts as a further EMV protection. The output signal of the integrator 9 is fed, if necessary through adapting elements 10, resistance for example, into the tripping apparatus at the point D as a simulated signal for the acceleration transducer 1.

In the tripping apparatus, this test signal is treated like a signal of the acceleration transducer 1 and further processed in the manner already described. If the evaluation circuit 2 is intact, then the switching stage becomes activated and, point A is thereby connected to the positive pole of the voltage source. The answering signal can also be tapped at the same point at which the test signal is fed in. It consists, in the arrangement according to FIG. 1, in that the alternating voltage signal fed in is delayed for a time determined by the integrator 9 and the integrator of the tripping apparatus, has a direct voltage part added due to the switching in of the positive pole, and is thereby cancelled. In the other case, if the switching stage 3 and safety switch 5 were mutually interchanged and the measurement were accordingly performed at the point B, the alternating voltage signal would collapse after the time delay due to short-circuiting by the switching stage 3. The evaluation of the test signal may be performed by an evaluation instrument 15, which may be either an oscilloscope or a threshold value switch with indicating lamp etc.

Lastly, it should be pointed out that the coupling of the output of the test circuit may be made both in series and also in parallel, and both conductively and capacitively. The circuit arrangement chosen also permits known voltage multiplication circuits to be employed instead of a simple rectification by the diode 8.

It is also possible to make appropriate use of detuning circuits, not shown, on test value transducers in bridge circuits. In order to test the function, the second terminal of the tripping element (point B in FIG. 1) may be provided with a high ohmic resistance which is wired to the negative pole, in order to limit the cross current through the tripping element to a safe value.

The chosen test arrangement therefore permits a testing and indication of the functional and operational safety of the tripping appliance in the installed condition and in the fully assembled vehicle, without isolating the connected tripping elements from the output.

A testing of the function of the evaluation electronics from the appliance output with response at the appliance output is therefore possible in simple manner with an increased level of safety.

While we have shown and described only one embodiment in accordance with the present invention, it is understood that the same is not limited thereto but is susceptible to numerous changes and modifications as known to one having ordinary skill in the art and we therefore do not wish to be limited to the details shown and described herein, but intend to cover all such modifications as are encompassed by the scope of the appended claims.

We claim:

1. A tripping apparatus in vehicles, particularly for an occupant protection apparatus in impact restraining systems, having an acceleration sensor, an evaluation circuit and a switching stage serially connected as input to a tripping element in series with an acceleration switch comprising
    a test circuit comprising
    a series arrangement of a filter tuned to a predetermined frequency, a rectifier and an integrator, and
    an input circuit means comprising a test generator for introducing to the series arrangement, a test signal comprising an alternating voltage having said predetermined frequency,
    the input circuit means being connected to a predetermined point of zero potential in the inactive condition, said point being located between the switching stage and the tripping element, and
    an output means of the test circuit connected to the input of the evaluation circuit, for producing an answering signal at the output of the test circuit.

2. A tripping apparatus according to claim 1, wherein the filter comprises a series oscillation circuit which is connected between the input circuit means of the test circuit and the rectifier.

3. A tripping apparatus according to claim 1, wherein the filter is constructed as a parallel oscillation circuit, which is connected through a capacitor between the predetermined point and the input to the rectifier.

* * * * *